Oct. 12, 1943.        W. W. McMAHAN        2,331,795
                          TIRE
                   Filed Dec. 18, 1940
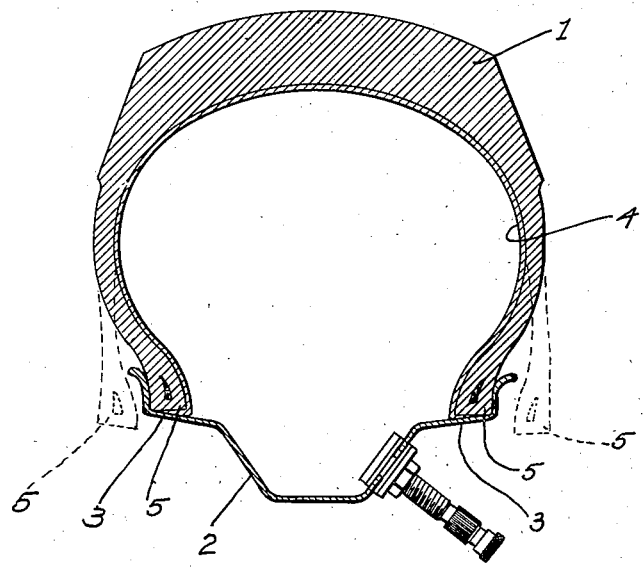
Inventor
William W. McMahan
By       /s/ Attorney Patented Oct. 12, 1943

2,331,795

UNITED STATES PATENT OFFICE 2,331,795

TIRE

William W. McMahan, Akron, Ohio, assignor to Wingfoot Corporation, Akron, Ohio, a corporation of Delaware Application December 18, 1940, Serial No. 370,645

2 Claims. (Cl. 18—53)

This invention relates to an improved tire, the method of making the tire and the method of mounting it on a rim.

It has recently been suggested that tubeless tires be employed and particularly where the space between the tire and the rim is to be completely filled with water. Considerable difficulty has been experienced in mounting the tubeless tires on the rim of a vehicle. Several mechanical means have been developed as aids in mounting such tires which comprise means for forcing the beads of the tire apart to cause them to be seated on the rim seats. While using mechanical means for spreading the beads, it has been the usual practice to inflate the tire with air under pressure to help in forcing the beads apart and seating them on the rim.

According to this invention the tire is made with the beads spread farther apart than the bead seats. The beads are pressed together while the tire is being placed on the rim and then because of the natural tendency of the beads to spread they tend to seat themselves on the rim seats. With the tire properly seated it is an easy matter to fill the tire with water, because the joint between the tire and the rim is airtight. It may be desirable to use air in helping to seat the beads of the tires of this invention, although if sufficient spring is provided the tire beads should seat themselves so that the tire may be inflated at once with water without the necessity of first inflating it with air.

The invention will be further described in connection with the accompanying drawing.

In the drawing the tire I is seated on the drop center rim 2. The rim seats for the tire are indicated at 3. It should be noted that the tire is in general the shape of a conventional tire as it is mounted on the rim. The interior of the tire is coated with a "gum coat" 4 which is a substantially pure coating of rubber which may be applied as a cement dissolved in solvent, or it may be calendered on to the tire during manufacture. This coat makes the tire water-impervious.

The beads 5 of the tire before mounting are spread wider apart than after mounting. The shape of the tire before mounting is shown in dotted lines. The beads before mounting are naturally spread several inches wider than the beads after mounting, and this difference in the bead spread before and after mounting may amount to as much as one-third or more of the distance between the outer edges of the beads when mounted on the rim. The distance to which the beads are spread will depend upon the construction of the tire, etc.

Preferably the tire is molded in a mold designed to produce a tire with the beads spread an unusual amount. If preferred a conventional tire may be converted into a tire of the type shown by spreading the beads and while holding them spread, heating the tire to vulcanizing temperature. This causes the beads to naturally be spread farther apart than before heating. After heating the means for holding the beads separated may, of course, be removed. As an alternative method the tire may be partially vulcanized in a conventional mold, and then after removing it from the mold and while holding the beads spread apart to the desired distance, the vulcanization may be completed.

To mount the tire on the rim the beads are pressed together. After the tire is on the rim, it may be somewhat difficult to set the beads. Mechanical means may be used to aid in this process. The natural tendency of the beads is to spring in place because of the fact that when molded, the distance between the beads is greater than the distance between the beads after mounting on the rim. This natural tendency of the beads may cause the beads to seat themselves on the rim seats 3, although ordinarily some pounding of the tire will be required to bring this about. It may even be necessary to inflate the tire with air under pressure to spread the beads and cause them to seat themselves before turning any water into the tire.

To fill the tire completely with water some means for venting the air must be provided. Various means for doing this are known in the art. The valve through which the tire is filled may be a compound valve with a double passage through the rim. One passage may be used for venting the air while the other passage is used for introducing the water into the tire. The inner end of the air vent may have a hose connected to it, the other end of which may have cork or other floating means attached to it to cause the inner end of the rubber tube to rise to the top of the interior of the tire as the tire is inflated with water to vent the entrapped air from within the tire. This is described and claimed in application Serial No. 370,654 of Andrew J. Palko, filed December 18, 1940. Instead of floating the inner end of the tube, it may be fastened with a suitable adhesive tape to the inner wall at its periphery. This is described and claimed in application Serial No. 370,647 of Elmer F. Brunner, filed December 18, 1940. By placing the end of the tube uppermost all of the air will be vented from the tire as the tire is filled with water. After completely filling the tire with water the air vent may be stopped so that a hydrostatic head of water is produced within the tire. Any suitable means for completely filling the tire with water may be employed.

What I claim is:

1. The method of forming a tire with widely spread beads which comprises partially vulcanizing the tire with the beads relatively close together, spreading the beads, and then finishing the vulcanization of the tire with the beads spread a relatively wide distance.

2. That method of adapting a beaded, straight-sided pneumatic tire to mounting as a tubeless tire on a rim, which includes the steps of at least partially vulcanizing the tire with the beads separated a distance substantially equal to the distance they will be apart on the rim in use, thereafter spreading the beads a considerably greater distance apart, and again applying heat at vulcanizing temperatures to the tire with the beads held in the last-named position and for periods sufficient to cause the tire to take a set with the beads in the last-named position.

WILLIAM W. McMAHAN.